(No Model.)

C. HARTZELL.
PLOW.

No. 492,724. Patented Feb. 28, 1893.

Witnesses:
Jesse Heller
Phil C. Masi

Inventor:
Conrad Hartzell
by C. W. Anderson
his Attorney

UNITED STATES PATENT OFFICE.

CONRAD HARTZELL, OF ST. JOSEPH, MISSOURI.

PLOW.

SPECIFICATION forming part of Letters Patent No. 492,724, dated February 28, 1893.

Application filed June 18, 1892. Serial No. 437,195. (No model.)

*To all whom it may concern:*

Be it known that I, CONRAD HARTZELL, a citizen of the United States, and a resident of St. Joseph, in the county of Buchanan and State of Missouri, have invented certain new and useful Improvements in Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
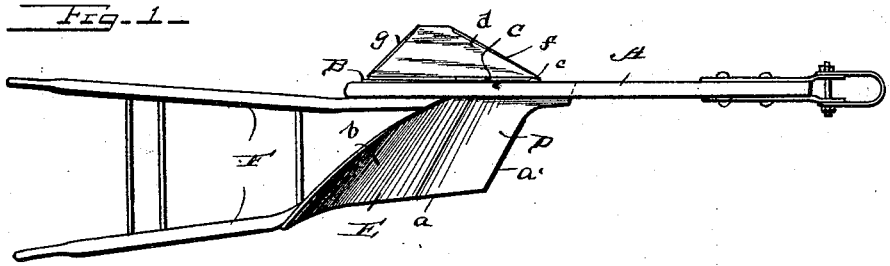
Figure 4:
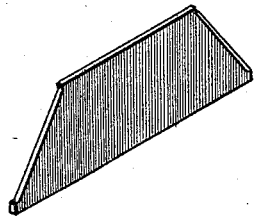
Figure 2:
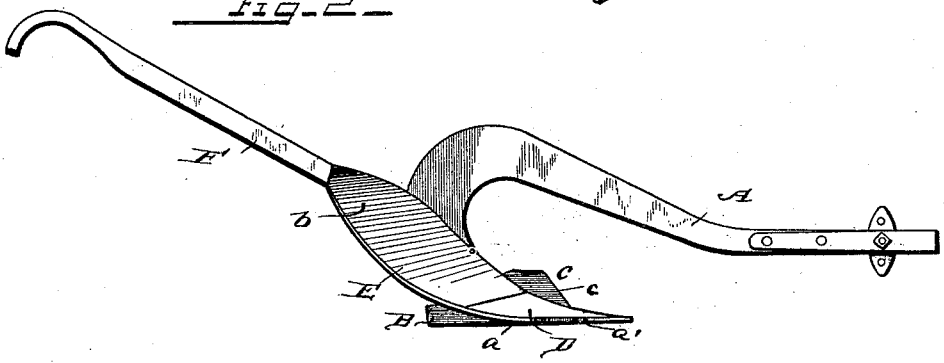
Figure 3:
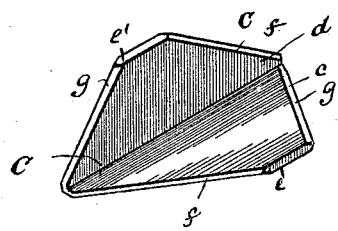

Figure 1 of the drawings is a top plan view. Fig. 2 is a perspective view. Fig. 3 is a perspective view of the combined colter landside and undercutting share. Fig. 4 is a perspective view in modified form of land side and colter.

This invention has relation to certain new and useful improvements in plows, and refers more especially to the novel form and construction of moldboard employed, together with the form and construction of the colter and undercutting share.

The objects of the invention are; first, to provide a moldboard of such character, that it will be particularly effective for use at any depth, bringing up the latent or sub-soil and thoroughly commingling it with the top soil, said moldboard at the same time being of such shape that it will to a large extent run free without clogging or loading in the most sticky soils, owing to the manner in which the pressure of turning the furrow is directed against it.

A second, and further object is to provide a combined, reversible land-side share, and colter of such construction that a much shorter land bar may be used in connection therewith, whereby the plow is rendered much lighter without impairing the means for keeping it steady while running. The undercutting share is arranged to undercut a large part of the succeeding furrow slice, so that the force required to turn said furrow is greatly lessened, enabling the moldboard to be greatly narrowed, at its upper, rear, or turning portion. Consequently, and owing also to the fact that the moldboard is concaved, the entire pressure of turning the furrow falls upon a minimum surface, and thereby acts to keep said moldboard thoroughly scoured and free from adhering soil.

With these objects in view, the invention consists in the novel construction and combination of parts, all as hereinafter specified.

In the accompanying drawings illustrating the invention, the letter A designates the beam, B the land-bar, C the combined reversible colter landside and undercutting share, D the main share and point, E the moldboard, and F the handles. The share D is of broad transverse form but slightly inclined to the horizontal from its forward edge back, and has an outer edge $a$, oblique to its forward edge $a'$. The moldboard E where it joins the share is of the same width as the latter, and its outer edge forms a continuance of the outer edge of the said share, in a direction substantially parallel with the line of draft. As it extends upwardly and rearwardly, said moldboard gradually decreases in transverse measurement, such decrease being wholly from the upper inner edge. The portion $b$ thereof where the greatest, and in fact the entire, turning pressure is brought to bear, is therefore of much less width than the corresponding portion of the ordinary moldboard, which concentrates such pressure upon a comparatively small area of surface, further reduced to a minimum by the fact that the said portion is of concaved, cylindric form. The pressure is therefore so great at this point as to prevent even the most wet and sticky soil from adhering thereto. The upper portion of the moldboard is joined to the furrow handle (in walking plows) as illustrated, said handle thereby forming an extension of the moldboard. Owing to the broad and almost horizontal form of the share and lower portion of the moldboard, it will be observed that the furrow slice will not be turned upside down, or inverted merely, but that a portion of the top soil will be turned under, and virgin or sub-soil will be brought up and the two intermingled, thus fertilizing the old, worn out soil, putting new life therein, causing the deep seed bed to remain moist in dry weather, and leaving the soil in such shape (in rolling land) as to prevent its washing.

The combined reversible landside, undercutting share, and colter consists of a single piece secured to the land bar B. In the drawings, the portion c forms the landside and colter, and the portion d the undercutting share. Said portions are each of general triangular form united at their bases or longest sides, at right angles to each other, the angles opposite such sides being truncated as shown at e, e', such portions being left the full thickness of the metal. The form is perfectly symmetrical, so that it may be reversed, to cause the part c to serve as the undercutting share, and the part d as the landside and cutter, the oblique edges f, f, and g, g, being ground or sharp. It will be observed from the drawings that this landside, colter and share, are of abbreviated length, terminating in front of the standard of the beam, and that the land bar is correspondingly shortened. But, owing to the peculiar form of said colter, landside, and share, sufficient land bearing is provided to hold the plow steady in running, while rendering it much lighter than the ordinary plow of corresponding size. It is owing to the undercutting share, which underscores a large portion of the next furrow, that I am able to use the small surface moldboard above described, and at the same time cut as large or even larger furrows than a plow having a greater area of moldboard. For special uses of the plow, however, such as in nursery and garden work, for barring off, ditching, and trenching, where the underscoring is unnecessary, I use a straight plate landside and colter H, as shown in Fig. 4. This consists of a plate having its ends cut obliquely and ground, being capable of being reversed, or used either end.

Having described this invention, what I claim, and desire to secure by Letters Patent, is—

1. In a plow, the combined reversible landside, undercutting share, and colter, consisting of an integral piece in the form of two truncated triangles joined to each other at their bases and at right angles to each other, the edges of said piece being sharpened to form cutters with the exception of the truncated portions, said piece being perfectly symmetrical in form, whereby it may be reversed, substantially as specified.

2. In a plow, the combination with the broad flat share, and the moldboard having a broad transverse forward portion, and a narrow concaved rear portion, gradually decreasing in width from its upper edge, of the combined landside, colter, and undercutting share, said landside being abbreviated in length, of symmetrical angular truncated form, and reversible, substantially as specified.

In testimony whereof I affix my signature in presence of two witnesses.

CONRAD HARTZELL.

Witnesses:
WM. M. ALBIN,
F. J. LUFLER.